(12) United States Patent
Merry et al.

(10) Patent No.: US 10,235,147 B2
(45) Date of Patent: Mar. 19, 2019

(54) DISCOVERY AND ACTIVATION OF APPLICATION EXTENSIONS

(75) Inventors: Matthew Merry, Bellevue, WA (US); Hart Wilson, Auburn, WA (US); Mohammad Almalkawi, Bellevue, WA (US); Pierre-Yves Santerre, Bellevue, WA (US); Sriram Sarda, Redmond, WA (US); Tassaduq Basu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1072 days.

(21) Appl. No.: 13/218,475

(22) Filed: Aug. 26, 2011

(65) Prior Publication Data
US 2013/0055285 A1  Feb. 28, 2013

(51) Int. Cl.
| G06F 9/00 | (2006.01) |
| G06F 8/61 | (2018.01) |
| G06F 9/54 | (2006.01) |
| G06F 9/445 | (2018.01) |

(52) U.S. Cl.
CPC .......... *G06F 8/61* (2013.01); *G06F 9/54* (2013.01); *G06F 9/44505* (2013.01); *G06F 9/44526* (2013.01)

(58) Field of Classification Search
None
See application file for complete search history.

(56) References Cited

U.S. PATENT DOCUMENTS

| 6,564,377 B1* | 5/2003 | Jayasimha ........ G06F 9/44521 717/174 |
| 7,406,695 B2* | 7/2008 | Dattke et al. ................. 719/315 |
| 2005/0289535 A1* | 12/2005 | Murray et al. ................ 717/172 |
| 2007/0156913 A1* | 7/2007 | Miyamoto et al. ........... 709/230 |
| 2007/0239985 A1* | 10/2007 | Bernabeu-Auban et al. ...... 713/168 |
| 2008/0209316 A1 | 8/2008 | Zandstra |
| 2010/0169805 A1 | 7/2010 | Wilson et al. |
| 2010/0185697 A1* | 7/2010 | Lehr et al. ................... 707/803 |
| 2010/0325085 A1 | 12/2010 | Stritzel et al. |
| 2011/0197184 A1* | 8/2011 | Sheehan ....................... 717/168 |

OTHER PUBLICATIONS

Hackett, Scott, "Plug-in Extensibility trhough Relection in .Net and Java", Feb. 20, 2008, "Hello World"—The SlickEdit Developer Blog, pp. 1-4.*

(Continued)

*Primary Examiner* — Charles E Anya

(57) ABSTRACT

The operating system of a computer maintains an extension catalog that stores data relating extensions with information about the contracts the extensions support. Extensions are registered in this catalog according to the contract they implement. The extension catalog can be queried to identify extensions that support a given contract. An extension can be selected from among the results from a query, and the selected extension can be activated. When activated, the extension is set up by the operating system as an independent process from, and with context from, the application for which it is an extension. Information about the extension is provided to the application to enable the extension and the application to communicate according to the supported contract.

20 Claims, 5 Drawing Sheets

(56) References Cited

OTHER PUBLICATIONS

Sidharth Choudhury et al "Downloadable Service Contracts for Disconnected Transactions" (Year: 2002).*
Bolour, Azad, "Notes on the Eclipse Plug-in Architecture", Retrieved at <<http://www.eclipse.org/articles/Article-Plug-in-architecture/plugin_architecture.html>>, Bolour Computing, Jul. 3, 2003, pp. 28.
Kaiser, Marco, "Plugin SDK Concepts", Retrieved at <<http://devwiki.seesmic.com/w/page/25026108/Plugin-SDK-Concepts>>, Retrieved Date: May 5, 2011, pp. 5.
"Plug-ins and application classes", Retrieved at <<http://publib.boulder.ibm.com/infocenter/hatshelp/v70/index.jsp?topic=/com.ibm.hats.doc/doc/rcppgd04.htm>>, Retrieved Date: May 5, 2011, pp. 7.
"Trac Component Architecture", Retrieved at <<http://trac.edgewall.org/wiki/TracDev/ComponentArchitecture>>, Retrieved Date: May 5, 2011, pp. 4.
Nehrer, Peter, "Developing Eclipse Plug-ins", Retrieved at <<http://www.developer.com/lang/article.php/3552481/Developing-Eclipse-Plug-ins.htm>>, Sep. 29, 2005, pp. 4.
"Plug-ins with Extensions and Extension Points", Retrieved at <<http://www.generalinterface.org/docs/display/GIDOCS/Plug-ins+with+Extensions+and+Extension+Points>>, Mar. 3, 2010, pp. 3.

* cited by examiner

DISCOVERY AND ACTIVATION OF APPLICATION EXTENSIONS

BACKGROUND

Computer programs are commonly designed so that one application can have its functionality extended or enhanced by another application. The other application can interface with the original application in a variety of ways, and the mechanism for this extension can have several names, such as a contract, application programming interface (API), plug-in, extension, add-on, and the like.

Several challenges arise when designing applications that can be extended. These challenges include, but are not limited to, the ability to describe extension points, the ability to discover extensions, and the ability to activate those extensions. Security and performance issues also can arise with extensions. For example, an extension can cease operating, terminate or degrade performance, which in turn can impact the original application. Additionally, the extent to which data is shared between the extension and the original application can affect security of that data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The operating system of a computer maintains an extension catalog that stores data relating extensions with information about the contracts the extensions support. Extensions are registered in this catalog according to the contract they implement. The extension catalog can be queried to identify extensions that support a given contract. An extension can be selected from among the results from a query, and the selected extension can be activated. When activated, the extension is set up by the operating system as an independent process from, and with context from, the application for which it is an extension. Information about the extension is provided to the application to enable the extension and the application to communicate according to the supported contract.

Accordingly, in one aspect, a computer-implemented process supports communication between an application and an extension according to a contract. An extension catalog that stores data relating extensions and contracts the extensions support is maintained. The application is activated as a process and has a context. The extension catalog is queried to identify extensions supporting a contract. An extension, selected from among the extensions supporting the contract, is activated as an independent process from and with context from the application. Information about the extension is provided to the application, thereby enabling the application and extension to communicate according to the contract.

In another aspect, such a process is embodied in an article of manufacture, comprising one or more computer storage media and computer program instructions stored on the computer storage media. Such instructions, when processed by a processing device, instruct the processor to perform operations, wherein the instructions include operations that provide an operating system through which an application accesses resources of the computing machine. The operating system maintains an extension catalog that can be queried to select and activate an extension.

In another aspect, such a process is embodied in the operating system of a computing machine, which includes one or more processors and one or more computer storage media on which computer program instructions are stored. Such instructions, when processed by a processing device, instruct the processor to perform operations, wherein the instructions include operations that provide an operating system through which an application accesses resources of the computing machine. The operating system maintains an extension catalog that can be queried to select and activate an extension.

In one implementation, the operating system includes a mechanism for providing information about the identified extensions to the application and for receiving from the application an indication of the selected extension.

In one implementation, the operating system maintains a registry and the extension catalog is maintained in the registry. The extension catalog can be maintained in a data file. The extension catalog can include a plurality of extension catalogs, with a separate extension catalog maintained for each user supported by the operating system.

In one implementation, the operating system further provides a mechanism, operative when an extension is installed on the computing machine, for reading data from the extension to identify one or more contracts supported by the extension, and to identify an extension registration object related to each contract. It may also include a mechanism for storing information relating the extension, the contract and the extension registration object in the extension catalog.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment for supporting extensions.

Figure 1:
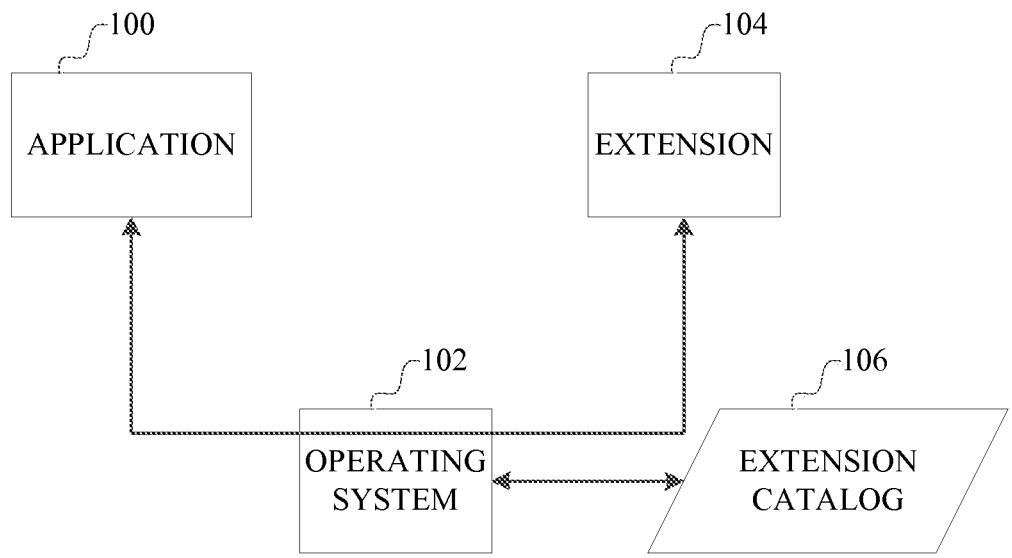
FIG. 1 is a block diagram of an example computing environment supporting extensions.

Referring to FIG. 1, an application 100 is a computer program that is run on a computer system that has an operating system 102. The operating system is a computer program run on a computer system that manages hardware resources and provides services to applications that can be run on the computer system. An extension 104 also is a computer program that runs on the operating system 102 and communicates with application 100 in accordance with a specified interface that both the application and the extension implement, herein called a contract. Such an interface also may be called an application programming interface (API), an example of which is the component object model (COM).

Extensions are registered through the operating system 102 in an extension catalog 106. The extension catalog stores data relating extensions with information about the contracts the extensions support. Extensions are registered in this catalog according to the contract they implement. The extension catalog can be queried to identify extensions that support a given contract. As will be described in more detail below, an application 100 queries, through the operating system, the extension catalog to identify an extension that support a given contract. An extension is selected from among the results of the query and is activated by the operating system 102. When activated, the extension 104 is set up by the operating system 102 as an independent process from, and with context from, the application 100 for which it is an extension. Information about the extension 104 is provided to the application 100 to enable the extension and the application to communicate according to the supported contract.

Given this context, an example implementation of such a system will be described in more detail in connection with FIGS. 2-4. It should be understood that the following is merely an example and that other implementations are possible.

Figure 2:
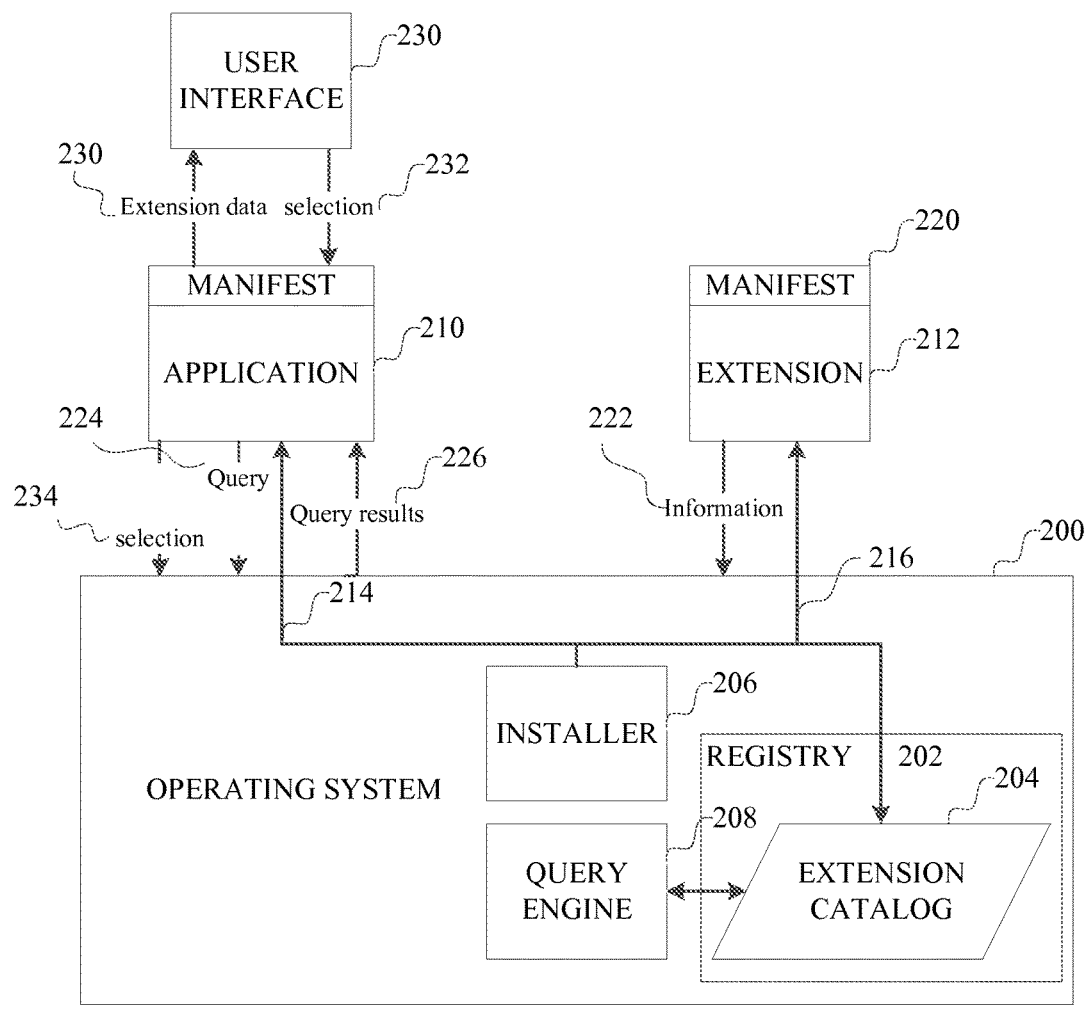
FIG. 2 is a data flow diagram illustrating an example implementation of the computing environment of FIG. 1.

In FIG. 2, the operating system 200 includes a registry 202, which is a database in which information about applications and other computer resources is stored. In the registry 202, an extension catalog 204 is stored. While this implementation illustrates the extension catalog stored in the registry 202, the extension catalog can be stored in other forms, such as in a database separate from a registry, or in a data file. The extension catalog can be stored in a manner such that it has its own application programming interface for reading and writing the catalog so as to abstract out the details of storage from applications that use the catalog.

The operating system 200 includes an installer 206 which installs applications on the computer system. The operating system also includes a query engine 208 that accesses the extension catalog. Both of these components will be described in more detail below.

The application 210 is run on the computer system as a process managed by the operating system 200. An extension 212, when activated, also is run on the computer system as a separate process, in the context of the application 210, managed by the operating system. As indicated at 214 and 216, the application and the extension communicate with each other in accordance with the contract they both implement.

Prior to being enabled to communicate with each other, the application and the extension are installed on the computer system and information about the contracts implemented by them are stored in the extension catalog. As an example implementation, the code for an application, such as application 210 or an extension 212, can include a manifest 220 that includes information about the contracts supported by application. Part of the operation of the installer 206 is to read this manifest 220, extract the information about the contracts supported by the application (e.g. as indicated at 222), and update the extension catalog 204. An example entry format for the extension catalog is a set of key-value pairs, including at least an identification of the contract supported, the name of the extension, and an identifier for an object, which can be activated through the operating system to activate the extension.

The following is an example of an extension catalog entry, in a specific example format, where 'SampleContract' is a contract that can be implemented by one or more extensions and 'SampleExtensionImplementation' is one such extension.

[HKEY_CURRENT_USER\Software\Classes\Extensions]
[HKEY_CURRENT_USER\Software\Classes\Extensions\ContractId]
[HKEY_CURRENT_USER\Software\Classes\Extensions\ContractId\SampleContract]
[HKEY_CURRENT_USER\Software\Classes\Extensions\ContractId\SampleContract\ActivatableClassId]
[HKEY_CURRENT_USER\Software\Classes\Extensions\ContractId\SampleContract\ActivatableClassId\SampleExtensionImplementation]
  "PackageId"="SampleExtensionImplementation. Package"
  "Vendor"="SampleExtensionImplementation.Vendor"
  "Icon"="SampleExtensionImplementation.Icon"
  "DisplayName"="SampleExtensionImplementation. DisplayName"
  "Description"="SampleExtensionImplementation. Description"
  "TimeInstalled"=hex(b):56,34,12,90,78,56,34,12
[HKEY_CURRENT_USER\Software\Classes\Extensions\ContractId\SampleContract\ActivatableClassId\SampleExtensionImplementation\CustomProperties]
[HKEY_CURRENT_USER\Software\Classes\Extensions\ContractId\SampleContract\ActivatableClassId\SampleExtensionImplementation]
  "SampleExtensionImplementation.Color"="My Favorite Color"
  "SampleExtensionImplementation.SampleString"="Sample String"
  "SampleExtensionImplementation.Rating"=dword:00000005

Information for activation of this extension (the location of the executable, trust level, etc.) can be stored in a separate catalog that can be independent of the extension catalog so long as there is a unique relationship maintained between the two catalogs, such as by using unique keys.

After an extension is registered in the extension catalog, it is possible for the operating system and optionally other applications to identify an extension and activate it. The extension catalog can be kept private to the operating system, in which case the discovery and activation of extensions is controlled by the operating system. The operating system or an application 210 provides a query 224 (specifying a contract, or a specific extension, or other information to help identify an extension) to the query engine 208 of the operating system 200, to query the extension catalog 204 to identify the extensions that support the given contract. The query engine 208 provides results 226 to the caller of the query. These results, for example, can be in the form of a list of sets of key-value pairs stored in the extension catalog for each of the extensions that support the given contract.

After receiving query results 226, information about the available extensions (shown at 228) can be provided to an individual through a user interface 230. The user interface can take any of a variety of forms and the invention is not limited thereby. Through the user interface, the individual can view information about one or more extensions in the query results and can provide an input. The input can, for example, indicate a selection of one or more extensions to activate. As another example, the input can indicate the individual's acceptance of an extension to activate. Given such an input, the user interface 230 provides an indication of a selection 232. In turn, the operating system 200 can activate the selected extension, as indicated at 234. If the application is enabled to have access to discovery and activate extensions, the activation by the operating system can be initiated by the application. After such activation, information is provided from the operating system 200 to the application 210 and extension 212 enabling them to communicate according to the given contract, as indicated at 214 and 216.

Having now described the architecture of such a system in FIGS. 1 and 2, flow charts describing the operations of installation of an extension, and discovery and activation of an extension, will now be described in connection with FIGS. 3-4.

Figure 3:
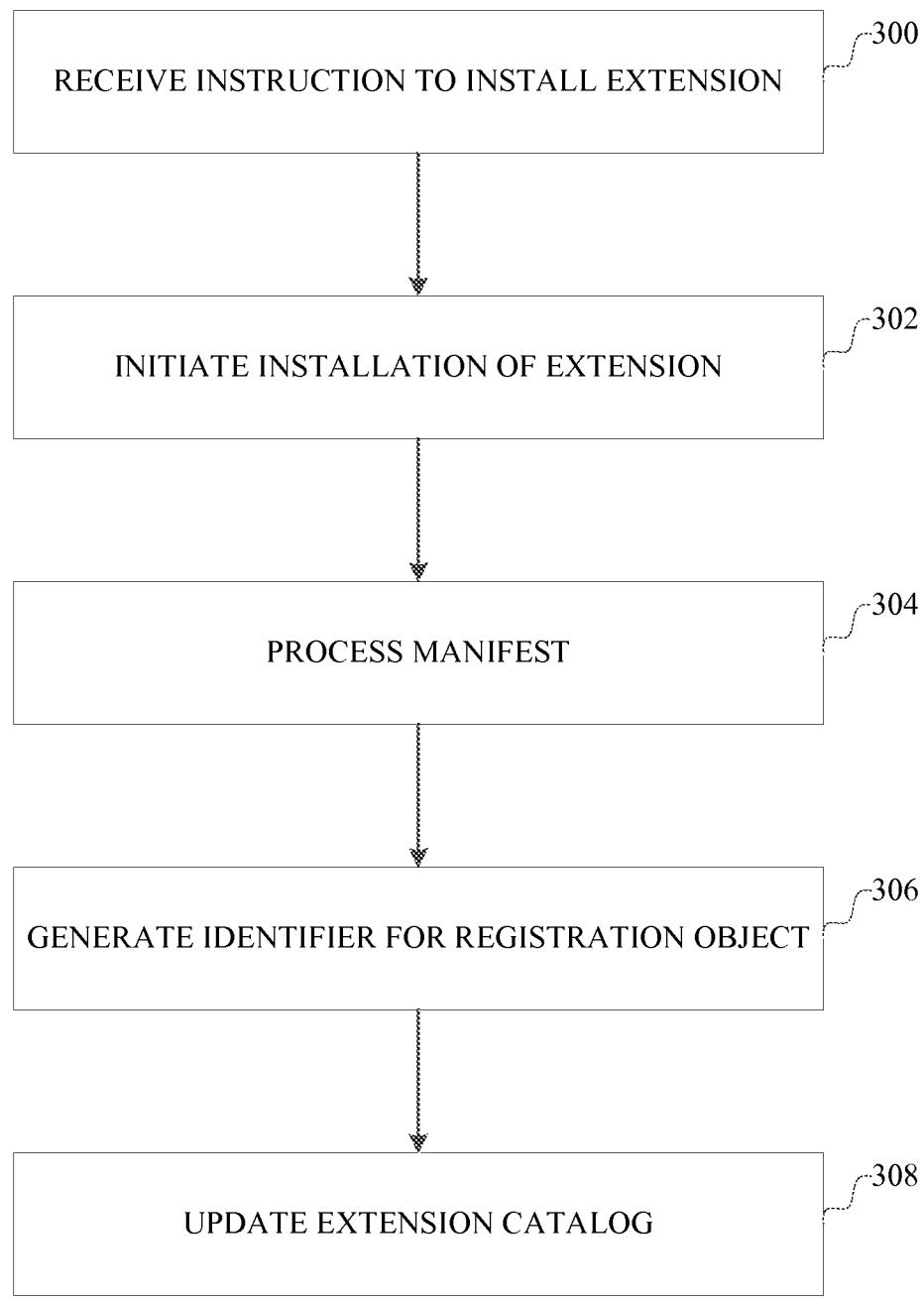
FIG. 3 is a flow chart describing how an extension can be registered in an extension catalog in one implementation.

In FIG. 3, the installation of an extension will now be described. As noted above, in one example implementation, the code for an extension can include a section called a manifest in which information about the extension is stored. This information can include data about the contracts supported by the extension. It also may include other key-value pairs relevant to the extension. An individual usually initiates the process of installation by selecting the extension and instructing the operating system to install the selected extension. There are a variety of ways in which an extension can be selected for installation and the invention is not limited thereby.

In the example implementation shown in FIG. 3, the operations are performed by the operating system. First, the operating system receives 300 the instruction to initiate installation of an extension. The operating system then initiates 302 the installation of the extension. During the installation process, the operating system processes 304 the manifest to extracts the information about the contracts supported by the extension. The extension also has a registration object, with an activate method that the operating system uses to activate the extension. An identifier of this registration object also is generated 306. Next, the extension catalog is updated 308 to store the data relating the extension with information about the contracts the extension supports.

Using the process of FIG. 3, multiple extensions supporting multiple contracts can be installed, and their availability can be dynamically discovered by applications through queries to the extension catalog.

Figure 4:
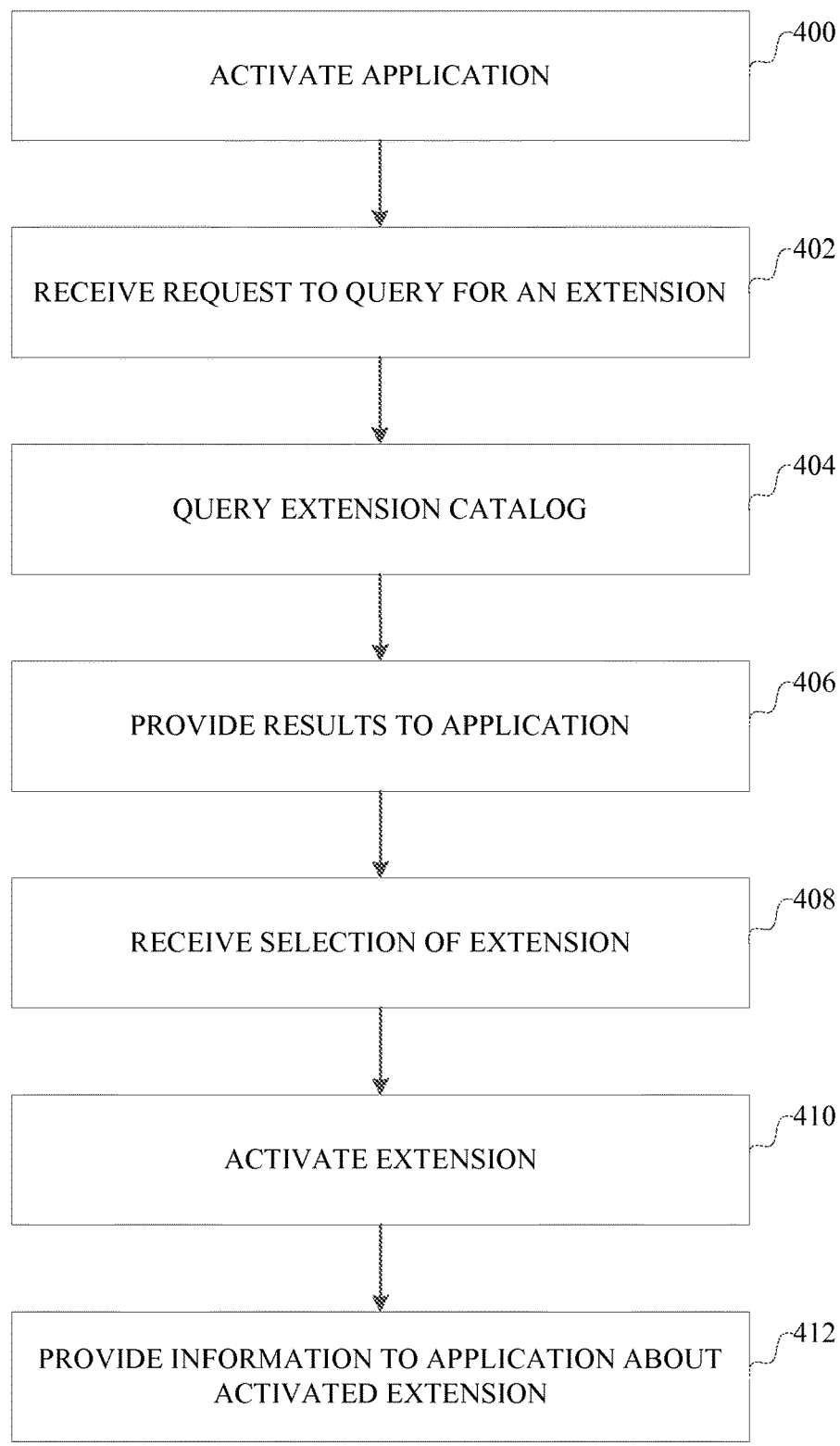
FIG. 4 is a flow chart describing how an extension can be activated in one implementation.

Turning now to FIG. 4, example implementations of the process of discovering and activating an extension will now be described.

An extension is activated as a process separate from, but in the context of, other applications. Therefore it is natural that an application is activated first, as indicated at 400. Typically, an application runs as its own process on the computer. When an application wants to access an extension, for example to open a file of a format for which it does not have native capability, it can request the operating system to query the extension catalog, specifying a contract for the extension. The operating system receives 402 this request, then queries 404 the extension catalog. The results of the query can be provided 406 to the application. The application in turn indicates to the operating system which extension is selected or authorized. The selection can be done by the application by prompting the user through a user interface, or through selection and activation logic. In some cases, the selection made by the application or its user is merely an authorization of the activation of an extension. In some cases, the operating system does not provide query results and selects and activates an extension without the user or application intervening. Such a scenario can be implemented for default extensions for handling different data file types, for example. The operating system receives 408 an indication of the selected extension, and activates 410 the extension. For example, if the extension has a registration object with an activate method, then the operating system calls the activate method of this registration object. Information about the application and extension are provided 412 by the operating system to the application and the extension to enable them to communicate according to the specified contract. As an alternative implementation, an application could be enabled to query the extension catalog directly, and an application programming interface for allowing such access can be provided.

By using such an extension catalog and a query process to discover and activate extensions, activation of extensions is constrained to what can be queried. In addition, if activation occurs through registration objects, then activation of extensions is further constrained to valid registration objects identified through queries. Because the queries to the extension catalog constrain the activation of extensions, it is possible to build scoping, validation and protection logic into the query process.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 5:
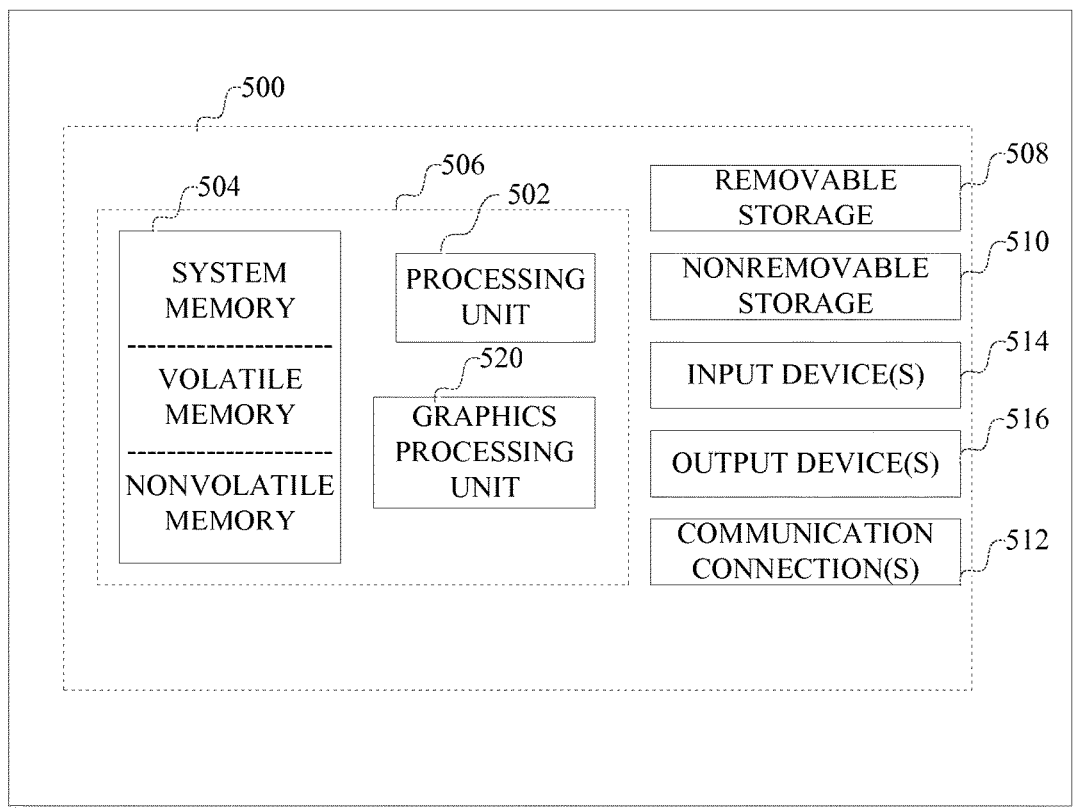
FIG. 5 is a block diagram of an example computing device in which such a system can be implemented.

FIG. 5 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 5, an example computing environment includes a computing machine, such as computing machine 500. In its most basic configuration, computing machine 500 typically includes at least one processing unit 502 and a memory system 504. The computing device may include multiple processing units and/or additional co-processing units such as graphics processing unit 520. Depending on the exact configuration and type of computing device, memory system 504 may include one or more volatile memory devices (such as RAM), and/or one or more non-volatile memory devices (such as ROM, flash memory, etc.) or some combination of the two. This configuration is illustrated in FIG. 5 by dashed line 506. Additionally, computing machine 500 may also have additional features/functionality. For example, computing machine 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer program instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 500. Any such computer storage media may be part of computing machine 500.

Computing machine 500 may also contain communications connection(s) 512 that allow the device to communicate with other devices. Communications connection(s) 512 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 500 may have various input device(s) 514 such as a display, a keyboard, mouse, pen, camera, touch input device, and so on. Output device(s) 516 such as speakers, a printer, and so on may also be included. All of these devices are well known in the art and need not be discussed at length here.

This system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. § 101. Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process for managing discovery and activation of extensions of applications executed on a computer, the computer comprising a processor and memory and having an operating system executed by the processor, the operating system managing execution by the processor of each of the applications as separate processes for the applications, each process for an application having a context, the applications supporting one or more contracts, the computer-implemented process comprising:

the operating system maintaining, in storage, an extension catalog that stores data relating the extensions installed on the computer and contracts the extensions support, wherein, when installed, the extensions are registered by the operating system in the extension catalog according to the contracts supported by the extensions, by storing in the extension catalog, for each extension of the extensions, an identifier of a contract supported by the extension, a name of the extension, and an identifier for a validated registration object for activating the extension;

the operating system receiving a query from one of the applications with an identification of one of the contracts, and querying the extension catalog with the received identification of the one of the contracts to identify one or more of the extensions installed on the computer and supporting the one of the contracts;

the operating system receiving an indication of a selected extension for the one of the applications from among the one or more identified extensions supporting the one of the contracts;

the operating system accessing, from the extension catalog, the identifier of the validated registration object associated with the selected extension, and activating the selected extension using the validated registration object for the selected extension, the operating system managing execution by the processor of the selected extension as a separate and independent process from the process for the one of the applications, wherein the separate and independent process for the selected extension has the context from the process for the one of the applications; and the operating system providing information about the activated extension to the one of the applications and information about the one of the applications to the activated extension to enable the one of the applications and the activated extension to communicate according to the one of the contracts.

2. The computer-implemented process of claim 1, further comprising:

the operating system supplying information about the one or more identified extensions to the one of the applications; and wherein the indication of the selected extension is received by the operating system from the one of the applications.

3. The computer-implemented process of claim 1, wherein the operating system maintains a registry, and wherein maintaining the extension catalog comprises maintaining the extension catalog in the registry.

4. The computer-implemented process of claim 1, wherein the extension catalog is maintained in a data file.

5. The computer-implemented process of claim 1, wherein the extension catalog comprises a plurality of extension catalogs, with a separate extension catalog maintained for each user supported by the operating system.

6. The computer-implemented process of claim 1, further comprising:

when one of the extensions is installed, the operating system reading data from a data file for the one of the extensions to identify one or more of the contracts supported by the one of the extensions.

7. The computer-implemented process of claim 1, wherein the extension catalog comprises a set of key-value pairs for each extension of the extensions, the set of key-value pairs for each extension of the extensions including an identification of one of the contracts supported by the extension, a name of the extension, and an identifier of a registration object for activating the extension.

8. An article of manufacture comprising:
one or more computer storage media, being one of persistent storage and a memory device;
computer program instructions stored on the computer storage media which, when processed by a processing device of a computer, instruct the processing device to perform operations that provide an operating system through which applications executed on the computer access resources of the computer, the operating system managing execution by the computer of each of the applications as separate processes for the applications, each process for an application having a context, the applications supporting one or more contracts, the computer with the operating system comprising:
an extension catalog maintained in storage by the operating system, the operating system storing data in the extension catalog, the data relating extensions installed on the computer and contracts the extensions support, wherein, when installed, the extensions are registered by the operating system in the extension catalog according to the contracts supported by the extensions, by storing in the extension catalog, for each extension of the extensions an identifier of a contract supported by the extension, a name of the extension, and an identifier for a validated registration object for activating the extension;
a query engine in the operating system having an input for receiving a query from one of the applications with an identification of one of the contracts, and querying the extension catalog with the received identification of the one of the contracts to identify one or more of the extensions installed on the computer and supporting the one of the contracts, and having an output for providing information describing the one or more identified extensions supporting the one of the contracts; and
a mechanism in the operating system having an input for receiving an indication of a selected extension for the one of the applications from among the one or more identified extensions supporting the one of the contracts, and accessing, from the extension catalog, the identifier of the validated registration object associated with the selected extension, and activating the selected extension using the validated registration object for the selected extension, the operating system managing execution of the selected extension as a separate and independent process from the process for the one of the applications, wherein the separate and independent process for the activated extension and with has the context from the process for the one of the applications, and having an output for providing information from the operating system about the activated extension to the one of the applications and information about the one of the applications to the activated extension to enable the one of the applications and the activated extension to communicate according to the one of the contracts.

9. The article of manufacture of claim 8, wherein the operating system further provides information about the one or more identified extensions to the one of the applications and receives from the one of the applications the indication of the selected extension.

10. The article of manufacture of claim 8, wherein the operating system maintains a registry and wherein the extension catalog is maintained in the registry.

11. The article of manufacture of claim 8, wherein the extension catalog is maintained in a data file.

12. The article of manufacture of claim 8, wherein the extension catalog comprises a plurality of extension catalogs, with a separate extension catalog maintained for each user supported by the operating system.

13. The article of manufacture of claim 8, wherein the operating system further provides:
an installer, operative when one of the extensions is installed on the computer, for reading data from a data file for the one of the extensions to identify one or more of the contracts supported by the one of the extensions.

14. A computing machine comprising:
a processor;
at least one computer storage medium;
computer program instructions stored in the at least one computer storage medium that, when processed by the processor, instruct the processor to perform operations that provide an operating system of the computing machine through which applications executed on the processor access resources of the computing machine, the operating system managing execution of each of the applications by the processor as a separate processes for the applications, each process for an application having a context, the applications supporting one or more contracts, wherein the computing machine with the operating system comprises:
an extension catalog maintained in storage by the operating system, the operating system storing data in the extension catalog relating extensions and contracts the extensions support, wherein the extensions are registered by the operating system in the extension catalog according to the contracts supported by the extensions, by storing in the extension catalog, for each extension of the extensions an identifier of a contract supported by the extension, a name of the extension, and an identifier for a validated registration object for activating the extension;
a query engine in the operating system having an input that receives from one of the applications an identification of one of the contracts, and queries the extension catalog with the received identification of the one of the contracts to identify one or more of the extensions supporting the one of the contracts, and having an output for providing information describing the one or more identified extensions installed on the computer and supporting the one of the contracts;
the operating system being responsive to an indication of a selected extension for the one of the applications from among the one or more identified extensions supporting the one of the contracts, to access, from the extension catalog, the identifier of the validated registration object for the selected extension, and to activate the selected extension, using the validated registration object for the selected extension, the operating system managing execution by the process of the selected extension as an a separate and independent process from the process managed by the operating system for the one of the applications, where the separate and independent process for the selected extension has the context from the process for the one of the applications, and to provide information about the activated extension to the one of the applications and information about the one of the applications to the activated extension to enable the one of the applications and the activated extension to communicate according to the one of the contracts.

15. The computing machine of claim 14, wherein the operating system provides information about the one or more identified extensions to the one of the applications and wherein the one of the applications provides the indication of the selected extension.

16. The computing machine of claim 14, wherein the operating system maintains a registry and wherein the extension catalog is maintained in the registry.

17. The computing machine of claim 14, wherein the extension catalog is maintained in a data file.

18. The computing machine of claim 14, wherein the extension catalog comprises a plurality of extension catalogs, with a separate extension catalog maintained for each user supported by the operating system.

19. The computing machine of claim 14, wherein the operating system further provides:
- an installer, operative when one of the extensions is installed on the computing machine, for reading data from a data file for the one of the extensions to identify one or more of the contracts supported by the one of the extensions.

20. The computing machine of claim 14, wherein the extension catalog comprises a set of key-value pairs for each extension of the extensions, the set of key-value pairs for each extension of the extensions including an identification of one of the contracts supported by the extension, a name of the extension, and an identifier of a registration object for activating the extension.

* * * * *